Figure 1:
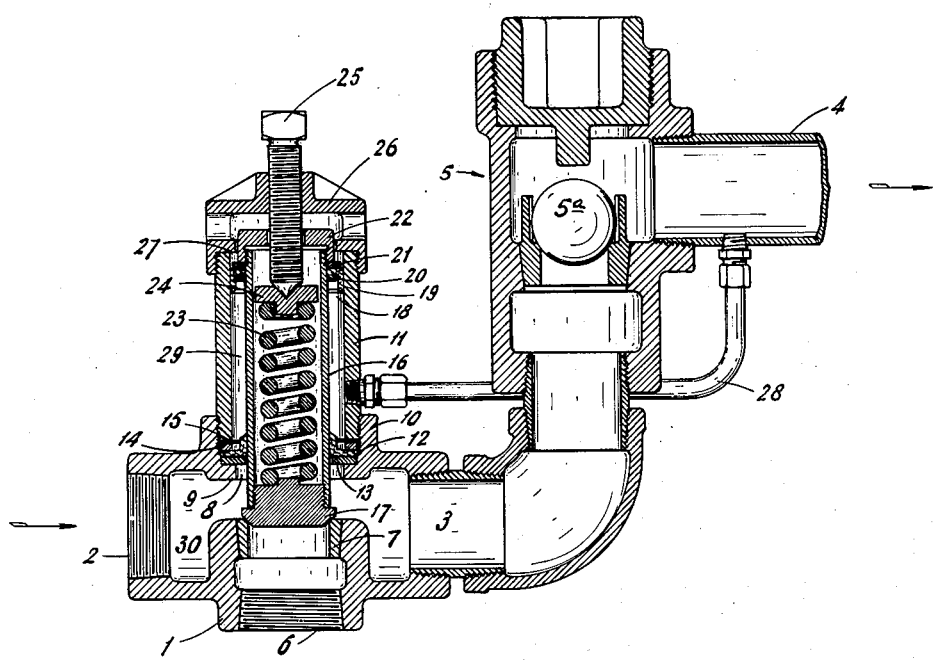

Dec. 19, 1939.  R. M. MAGNUSON  2,183,889
PRESSURE REGULATOR
Filed Oct. 13, 1936

INVENTOR.
Roy. M. Magnuson.
BY Philip A. Minnis
ATTORNEY

Patented Dec. 19, 1939

2,183,889

UNITED STATES PATENT OFFICE 2,183,889

PRESSURE REGULATOR

Roy M. Magnuson, San Jose, Calif., assignor to Food Machinery Corporation, San Jose, Calif., a corporation of Delaware Application October 13, 1936, Serial No. 105,389

8 Claims. (Cl. 137—153)

This invention relates to pressure regulators and regulating valves which are used to maintain a desired system pressure and more particularly to an improved device of this character which is sensitive and quick in operation and which can be used in systems of widely varying pressure characteristics without change in size, and with a minimum number of adjustments to adapt the regulator to systems operating at different pressures.

Such pressure regulators and regulating valves are employed in many types of pressure systems, one example of which is with pumps employed in spray rigs of the type used for spraying trees and vines with the usual character of abrasive-containing spray liquids by means of valve controlled spray nozzles. In such pumps when the spray is cut off, the valve effects bypassing of pumped spray fluid and thereby prevents the developing of excessive pressure in the system, while maintaining the system pressure at such a value that the maximum effectiveness of the spray is instantly available to the operator.

To obtain more effective spraying and to increase the effective spray ranges, it is desirable that a high pressure system be provided; for example, spray rigs capable of delivering spray at pressures up to a thousand pounds per square inch are desired. However, it is found that regulators and valves of the type heretofore used to regulate lower pressure systems, must be redesigned for higher pressure, and that the resultant construction of such regulators is much larger and heavier than the original regulator.

Heretofore, the increase in regulator size and weight incident to increase of pressure appears to have been considered necessary, and it is usual to find a regulator for a pump which occupies more space, and weighs more, than the weight and space assignable to one piston unit of the pump itself. In addition, an increase in pressure of the system has also meant increased ranges of differential pressures, to control the regulating valve, with the result that a less sensitive control can be provided, and the regulator is noisy in operation because of the large forces used for control thereof.

I have discovered that regulators need not vary appreciably in size and weight in proportion to the pressure of the system to which they are applied, and that by employing the principles of my invention in the design and construction of pressure regulating valves and the like, the size and weight thereof become substantially independent of the pressure or capacity of the system. Thus, appreciable economies in materials, space, and labor are effected. In addition, a very sensitive control is provided, as well as quiet operating characteristics. At the same time, the regulator construction is such that the abrasive-containing spray liquids commonly employed can be handled without undue wear.

It is, accordingly, an object of my invention to provide an improved pressure regulating valve which may alternatively be employed in systems which deliver liquid at widely divergent pressures.

It is another object to provide an improved pressure regulator or the like which is sensitive to slight pressure variations and can be controlled by opening and closing pressure differentials of a very low value.

Another object of the invention is to provide an improved pressure regulator which is adjustable for use in a wide pressure range and which has improved accuracy and reliability.

Another object of the invention is to provide an improved pressure regulator which is constructed to provide simplicity and compactness and to promote economy of manufacture and assembly.

Figure 2:
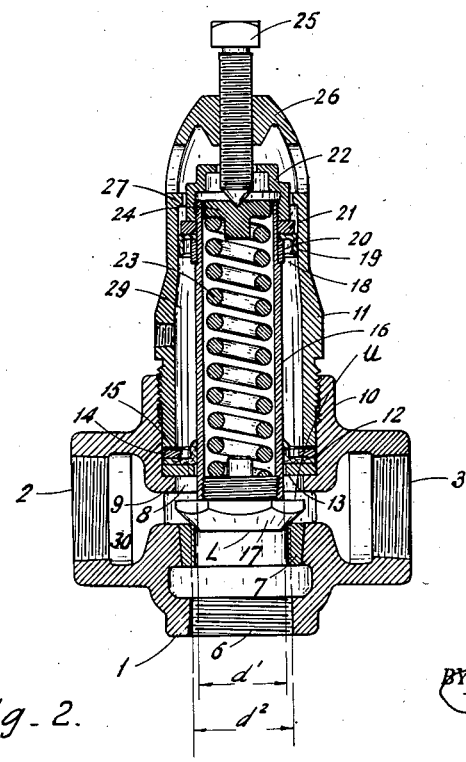

Other objects of my invention will appear in the following description in which reference is made to the accompanying drawing of preferred embodiments of my invention, and in which:

Fig. 1 is a vertical sectional view through the valve axis of one form of my invention; and Fig. 2 is a similar view of another form of my invention with certain similar parts omitted.

As stated above, a regulating valve constructed in accordance with my invention can be alternatively used in systems of widely varying pressures and capacities and one of the principal features which contributes to this result is the provision of means for subjecting the valve proper to both the pressure of the system and to atmospheric pressure. Preferably, the greater part or all of the cross sectional area of the valve proper is subjected to atmospheric pressure which is balanced on the other side by a substantially equal pressure, while only a small portion, if any, of the valve proper is subjected to the pressure of the system so that the valve operates under a proportionately smaller force. Thus, the mass of parts can be made independent of the pressure and capacity of the system and quiet, light action under heavy pressures can be obtained without pounding of the valve in closing.

One form of pressure regulating valve structure for obtaining the above noted advantageous results is illustrated in Fig. 1. The valve construction includes valve body 1 having intake port 2 through which fluid is received under pressure from a suitable pump or the like and an outlet port 3 for connection with pressure conduit 4. If desired, a check valve assembly may be used, such as generally indicated at 5, including ball valve 5a which is interposed between conduit 4 and outlet port 3 to prevent reversed flow of fluid in conduit 4 and maintain the pressure at the spray nozzles when the pressure drops within valve body 1.

Valve body 1 is also provided with pressure relief port 6 for connection to the source of fluid supply in disposing of the liquid passing therethrough. Relief port 6 is provided at its upper end with valve seat 7 in aligned opposed relation with aperture 8 defined by annular flange 9 of boss 10. Aperture 8 is provided to accommodate a valve plunger or stem carrying a poppet valve head for cooperation with valve seat 7 and being exposed to atmospheric pressure at its opposite end. Tubular valve stem or plunger 16 has head 17 threaded in one end thereof for cooperation with valve seat 7 and extends outwardly of valve body 1 through aperture 8.

Sealing means are provided within boss 10 for cooperation with valve body 17 including flexible hat-shaped packing 12 having the cylindrical portion thereof engaged with plunger 16 and the annular portion thereof held between packing retainer 13 and washer 14. Retainer 13 and washer 14 are mounted in boss 10 and held in place by cylindrical housing 11 threaded within boss 10 and engaging gasket 15 to compress packing 12 between retainer 13 and washer 14.

Valve plunger 16 is urged resilient to seat valve head 17 in closing position with respect to relief port 6, and is provided with pressure responsive means for moving valve head 17 away from seat 7 as controlled by the pressure in outlet conduit 4. Spring 23 is disposed axially within plunger 16 and is compressed between valve head 17 and spring seat 24 which is adjustably maintained in the desired position for a particular pressure system by adjusting screw 25 threaded in cap member 26 for housing 11 and passing freely through head 22 threaded on the upper end of plunger 16.

The pressure responsive means is held in position by cap 22 and comprises a piston structure indicated generally at 18 and including hat-shaped packing 20 compressed between packing collar 20 and packing washer 21, which are mounted on a reduced portion of plunger 16 and secured in place by cap 22. The chamber 29 formed within housing 11 and around plunger 16 below the piston structure is connected by conduit 28 to outlet conduit 4.

In operation, as for instance when the nozzles are shut off, a rise in pressure in conduit 4 is transmitted through conduit 28 to chamber 29 and against piston 18. If the force exerted against piston 18 is sufficient to overcome the pressure exerted by spring 23 and the frictional engagement of packings 12 and 19 with plunger 16 and cylinder 11, respectively, plunger 16 and valve head are lifted, the limit of such movement being determined by the engagement of washer 21 with shoulder 27 of cap member 26. Usually, however, the amount of lift will not be sufficient to cause engagement of washer 21 and shoulder 27. The lifting of the valve head opens the relief port to allow by-passing of liquid, thereby preventing excessive loads on the pump.

To illustrate the easy operation of the above valve structure whereby parts of small size and a spring of light pressure can be utilized, it will be noted that the exterior diameter of plunger 16 is substantially equal to the diameter of the valve seat 7 at the line of engagement with valve head 17. Thus, when the valve is closed, both sides of valve head 17 are subjected to atmospheric pressure only, the upper and lower areas of the projecting flange of valve head 17 being equal. If desired, the flange may be omitted and valve head 17 be made of the same diameter as plunger 16. As the pressure on both sides of valve head 17 is the same, spring 23 need only be of sufficient strength to keep the valve closed under the force exerted by the working pressure of the system against the piston structure 18, and, by providing a small area of piston structure, a small range of differential pressure for operation of the valve can be obtained. It is to be noted that the frictional drag imposed on the valve both in opening and closing between the packings 12 and 19, and the surfaces engaged therewith, prevents rapid fluttering of the valve because of very small pressure variations.

For certain types of pressure systems where a quick opening regulating valve is desired, the valve construction can be arranged to obtain this action without sacrificing the advantageous results obtained in the construction described above. A pressure regulating valve of this type is illustrated in Fig. 2 where similar parts have similar reference numerals applied thereto. In this construction, a small amount of fluid pressure is utilized to aid the spring in maintaining the valve closed, and the pressure area for transmitting such fluid pressure is provided within the valve body in communication with the pressure relief port so that such pressure will disappear when the valve is open and provide a rapid movement of valve head 17 away from seat 7 and quick opening of relief port 6.

For this purpose, plunger 16, (Fig. 2) has diameter $d^1$ which is slightly less than diameter $d^2$ of valve seat 7. Thus, valve head 17 is urged into engagement with valve seat 7 by the pressure exerted on the small annular area between diameters $d^1$ and $d^2$ on surface U of valve head 17. As a result, two forces tend to maintain valve head 17 in valve closing position, one being the pressure of spring 23 and the other being liquid pressure applied to surface U. For good results, the liquid pressure force should always be less than the spring pressure force, and in most cases substantially less. When a pressure rise oscurs in chamber 29 sufficient to barely overcome both of these forces and valve head 17 is raised slightly from seat 7, the liquid pressure on surface U disappears and valve head 17 moves quickly upward to completely open the pressure relief port.

Because the force provided by the liquid pressure area is made relatively small in relation to the total force tending to maintain the valve closed, surging of the valve is minimized and, further, no undue increase in size of the parts becomes necessary. As a result, one size valve can be used with systems of widely varying pressure and capacities as noted in connection with the structure shown in Fig. 1. It is to be noted that for various pressure systems, the desired pressure differential can be obtained readily by selecting the correct ratio between the area of piston 18 and the annular area on valve surface U between circles thereon having diameters $d^1$ and $d^2$, respectively.

As noted above, the described valve constructions not only provide for a substantially uniform valve structure for various pressure and capacity systems, but also enable a light and easy action without pounding.

Having described and illustrated certain preferred constructions of pressure regulating valve embodying my invention, it will be apparent to persons skilled in the art that the principles of my invention may be embodied in other forms. I desired it to be understood, therefore, that the invention is to be limited only by the scope of the following claims.

I claim:

1. In a pressure regulating valve for spray systems handling liquids containing abrasives, a chamber having inlet and outlet ports, a relief port in said chamber having a valve seat in the path of liquid flow from said inlet port to said outlet port, a poppet valve for engagement with said valve seat and being otherwise free of said relief port to provide an unobstructed path of liquid flow when said valve is in port opening position, a hollow stem for said valve projecting through and spaced from an apertured wall of said chamber, non-metallic sealing means between said stem and said apertured wall, the cross sectional area of said stem engaged with said sealing means being substantially equal to the cross sectional area of said relief port at the valve engaging portion of said valve seat, a cylinder around the projecting portion of said stem out of contact therewith, a spring positioned within said stem and reacting against said cylinder for urging said valve to port closing position, and a non-metallic piston on said stem and slidably engaging said cylinder, said piston being subject to system pressure to control movement of said valve to open position.

2. In a pressure regulating valve for spray systems handling liquids containing abrasives, a chamber having inlet and outlet ports, a relief port in said chamber having a valve seat in the path of liquid flow from said inlet port to said outlet port, a poppet valve for engagement with said valve seat and being otherwise free of said relief port to provide an unobstructed path of liquid flow when said valve is in port opening position, a stem for said valve projecting through and spaced from an apertured wall of said chamber, sealing means between said stem and said apertured wall, the cross sectional area of said stem engaged with said sealing means being substantially equal to the cross sectional area of said relief port at the valve engaging portion of said valve seat, a cylinder around the projecting portion of said stem out of contact therewith, a spring for urging said valve to port closing position, and a non-metallic piston on said stem and slidably engaging said cylinder, said piston being subject to system pressure to control movement of said valve to open position.

3. In a pressure regulating valve for spray systems handling liquids containing abrasives and having a chamber provided with inlet, outlet and relief ports; a valve seat in said relief port, a poppet valve for engagement with said valve seat and being otherwise free of said relief port to provide an unobstructed path of liquid flow when said valve is in port opening position, a stem for said valve projecting through and spaced from an apertured wall of said chamber, a seal between said stem and said wall, the cross sectional area of said stem within said seal being substantially equal to the cross sectional area of said relief port at the valve engaging portion of said valve seat, a casing around the projecting end of said stem out of contact therewith, a spring for urging said valve to port closing position, and pressure responsive means on said stem within said casing subject to system pressure to control movement of said valve to open position.

4. In a pressure regulating valve for spray systems handling liquids containing abrasives, a chamber having inlet and outlet ports, a relief port in said chamber having a valve seat in the path of liquid flow from said inlet port to said outlet port, a poppet valve for engagement with said valve seat and being otherwise free of said relief port to provide an unobstructed path of liquid flow when said valve is in port opening position, a hollow stem for said valve projecting through and spaced from an apertured wall of said chamber, non-metallic sealing means between said stem and said apertured wall, a cylinder around the projecting portion of said stem out of contact therewith, a spring positioned within said stem and reacting against said cylinder for urging said valve to port closing position, the cross sectional area of said stem engaged with said sealing means being less than the cross sectional area of said relief port to provide an annular area in said chamber on said valve subject to a liquid pressure force urging said valve to port closing position and of an amount less than the force of said spring, and a non-metallic piston on said stem and slidably engaging said cylinder, said piston being subject to system pressure to control movement of said valve to open position.

5. In a pressure regulating valve for spray systems handling liquids containing abrasives, a chamber having inlet and outlet ports, a relief port in said chamber having a valve seat in the path of liquid flow from said inlet port to said outlet port, a poppet valve for engagement with said valve seat and being otherwise free of said relief port to provide an unobstructed path of liquid flow when said valve is in port opening position, a stem for said valve projecting through and spaced from an apertured wall of said chamber, sealing means between said stem and said apertured wall, a cylinder around the projecting portion of said stem out of contact therewith, a spring for urging said valve to port closing position, the cross sectional area of said stem engaged with said sealing means being less than the cross sectional area of said relief port to provide an annular area in said chamber on said valve subject to a liquid pressure force urging said valve to port closing position and of an amount less than the force of said spring, and a non-metallic piston on said stem and slidably engaging said cylinder, said piston being subject to system pressure to control movement of said valve to open position.

6. In a pressure regulating valve for spray systems handling liquids containing abrasives and having a chamber provided with inlet, outlet and relief ports; a valve seat in said relief port, a poppet valve for engagement with said valve seat and being otherwise free of said relief port to provide an unobstructed path of liquid flow when said valve is in port opening position, a stem for said valve projecting through and spaced from an apertured wall of said chamber, sealing means between said stem and said wall, a spring for urging said valve to port closing position, the cross sectional area of said stem engaged with said sealing means being less than the cross sectional area of said relief port to provide an annular area in said chamber on said valve subject to a liquid presure force urging said valve to port closing position and of an amount less than the force of said spring, and pressure responsive means on said stem subject to system pressure for controlling movement of said valve to open position.

7. In a pressure regulating valve for spray systems of the type adapted for use in spraying trees, vines and the like with the usual character of abrasive-containing liquids, a valve chamber provided with inlet, outlet and relief ports, a poppet valve responsive to changes in pressure to open and close said relief port, a stem for said valve extending through a wall of said chamber, and a non-metallic seal between said stem and said wall to provide for sliding movement of said stem relative to said wall with the sliding fit between said seal and the cooperating metallic surface the only sliding fit exposed to liquid in said chamber, the cross sectional area of said stem within said chamber being substantially equal to the cross-sectional area of said relief port.

8. In a pressure regulator having a liquid conducting passageway therethrough, a relief port in said passageway, a poppet valve cooperating with said relief port and having a hollow stem, a cylinder into which the stem of said valve projects, a spring inside said stem acting to urge said valve to port closing position, a seal between said stem and said cylinder, a piston on said stem and working within said cylinder, said piston overlapping said spring, and means for transmitting the system pressure into the cylinder to actuate said valve.

ROY M. MAGNUSON.